(12) United States Patent
Bui

(10) Patent No.: US 7,680,214 B2
(45) Date of Patent: Mar. 16, 2010

(54) COMPUTATION OF SOFT BITS FOR A TURBO DECODER IN A COMMUNICATION RECEIVER

(75) Inventor: Thanh Ngoc Bui, Victoria (AU)

(73) Assignee: NEC Corporation, Tokyo (JP)

( * ) Notice: Subject to any disclaimer, the term of this patent is extended or adjusted under 35 U.S.C. 154(b) by 741 days.

(21) Appl. No.: 10/573,375

(22) PCT Filed: Sep. 24, 2004

(86) PCT No.: PCT/JP2004/014423

§ 371 (c)(1),
(2), (4) Date: Jan. 4, 2007

(87) PCT Pub. No.: WO2005/032085

PCT Pub. Date: Apr. 7, 2005

(65) Prior Publication Data

US 2007/0121763 A1    May 31, 2007

(30) Foreign Application Priority Data

Sep. 26, 2003  (AU) ............................... 2003905272
Sep. 20, 2004  (AU) ............................... 2004212605

(51) Int. Cl.
*H03K 9/00* (2006.01)
*H04L 27/06* (2006.01)
(52) U.S. Cl. ....................... 375/316; 375/341
(58) Field of Classification Search ............... 375/316, 375/341, 262; 714/794, 795
See application file for complete search history.

(56) References Cited

U.S. PATENT DOCUMENTS

| | | | |
|---|---|---|---|
| 4,654,872 A | 3/1987 | Hisano et al. | |
| 4,935,810 A | 6/1990 | Nonami et al. | |
| 5,282,030 A | 1/1994 | Nishimura et al. | |
| 5,432,543 A | 7/1995 | Hasegawa et al. | |
| 6,721,444 B1 | 4/2004 | Gu et al. | |
| 6,850,646 B1 | 2/2005 | Silver et al. | |
| 7,197,090 B1 * | 3/2007 | Berger et al. | 375/317 |
| 2003/0209893 A1 | 11/2003 | Breed et al. | |

(Continued)

FOREIGN PATENT DOCUMENTS

EP    0 887 976 A2    12/1998

(Continued)

OTHER PUBLICATIONS

Yingiu Xu, et al., "Pilot Symbol Assisted QAM with Iterative Filtering and Turbo Decoding over Raleigh Flat-Fading Channels," IEEE, 1999, pp. 86-91.

(Continued)

*Primary Examiner*—Khai Tran
(74) *Attorney, Agent, or Firm*—Dickstein Shapiro LLP

(57) ABSTRACT

A device (20) for computing a threshold Sthi used in demodulating a quadrature amplitude modulated (QAM) signal to generate a plurality of soft bits per received symbol for input to a turbo decoder, the device including: means (30) for computing the mean amplitude A of the received symbols and multiplying the mean amplitude A by of the received symbols and multiplying the mean amplitude A by a constant $C_i$ for a square QAM constellation with $4^m$ points, such that $Sth_i = A \times C_i$ where m is a positive integer and i is a positive integer from 1 to $(\sqrt{4^{m-1}})-1$.

11 Claims, 4 Drawing Sheets

U.S. PATENT DOCUMENTS

2004/0129478 A1    7/2004    Breed et al.
2007/0031001 A1    2/2007    Hamanaka

FOREIGN PATENT DOCUMENTS

EP            1 024 634 A2    8/2000

OTHER PUBLICATIONS

Stephane Le Goff, et al., "Turbo-Codes and High Spectral Efficiency Modulation," IEEE, 1994, pp. 645-649.
James K. Cavers, "An Analysis of Pilot Symbol Assisted Modulation for Rayleigh Fading Channels," IEEE, 1991, pp. 686-693.
International Search Report.

* cited by examiner

COMPUTATION OF SOFT BITS FOR A TURBO DECODER IN A COMMUNICATION RECEIVER

TECHNICAL FIELD

The present invention relates generally to demodulation of a quadrature amplitude modulation signal to generate soft bits for input to a channel decoder in a communication receiver and in particular in a spread spectrum communication receiver.

BACKGROUND ART

Communication systems employ forward error correction in order to correct errors caused by noise generated in transport channels. For example, a communication system typically uses a turbo code for the forward error correction. At the transmitter side, turbo encoder introduces redundancy bits based on information bits. The encoded bits at the output of turbo encoder are then modulated and transmitted to the receiver. At the receiver end, the receiver demodulates the received signal and produce received encoded bits to the turbo decoder. Turbo decoder decodes the received encoded bits to recover the information bits.

To maximize the advantage of the coding gain obtained by the iterative decoding process in the turbo decoder, rather than determining immediately whether received encoded bits are zero or one, the communication receiver assigns each bit of value on a multi level scale representative of the probability that the bit is 1. A common scale, referred to as Log-Likelihood Ratio (LLR) probabilities, represents each bit in an integer in some range, for example −32 to 31. The value of 31 signifies that the transmitted bit was 0 with a very high probability, and a value of −32 signifies that the transmitted bit was 1 with a very high probability. A value of 0 indicates that the logical bit value is indeterminate.

The turbo decoder in a communication receiver uses the LLR to determine whether a given information bit were transmitted given a particular received encoded bits. However, the computation of the LLR probabilities is a time-consuming and processing-intensive calculation. By way of explanation, in a transmitter of a communication system, each N encoded bits are mapped to one symbol (2 dimensional symbol with I and Q components). The symbol is transmitted over a channel to reach a receiver. The received symbol is attenuated and corrupted by noise. The task of the receiver's demodulator is to recover the N encoded bits from that noisy received symbol. To utilize the coding gain of the turbo decoder, N soft bits (or LLR) are generated.

Usually, the log likelihood is used to approximate the soft bit. The log likelihood $L(b_i)$ for i-th bit (i=0, 1, ..., N−1) is calculated as:

$$L(b_i) = \ln \frac{P(b_i = 0 \mid y)}{P(b_i = 1 \mid y)}$$

$$= \ln \frac{\sum_{z|b_i=0} P(z \mid y)}{\sum_{z|b_i=1} P(z \mid y)}$$

$$\approx \frac{1}{2\sigma^2}(\min_{z|b_i=1} |y-z|^2 - \min_{z|b_i=0} |y-z|^2)$$

where y is the received symbol, z is a symbol in the reference constellation, and $\sigma^2$ is noise variance. From this formula, it can be seen that significant computational complexity is involved in the estimation of $\sigma^2$, the estimation of the reference constellation (estimation of average amplitude of the desired signal), the calculation of the distances and min searches and the division to derive $L(b_i)$ In order to simplify the log likelihood computation, a simplified method is proposed in International Patent Application No WO 01/67617 for generating the soft decisions. A particular example described in that document is the demodulation of a 16 Quadrature Amplitude Modulation (QAM) signal in a spread spectrum communication system. A 16 QAM constellation is shown in FIG. 1, where each of the 16 symbols in the constellation corresponds to 4 encoded bits. FIG. 2 highlights the relationship between the encoded bits and the location of each symbol. For example, if b0=1 and b1=0, the symbol has negative I and positive Q component. Based on similar observations for b1 and b3, soft bits $L(b_i)$ can be generated as follows:

$$L(b_0)=yI, L(b_1)=yQ, L(b_2)=Sth-abs(yI), L(b_3)=Sth-abs(yQ)$$

However, a complex circuit must be used in the arrangement described in the above-mentioned document for calculation of $Sth_i$, which involves:

(i) calculation of interference power and calculation of desired signal power for each multipath based on pilot signal, and (ii) mapping signal and interference power to C/I for each path, and summing to get total C/I, which is then used as an estimate of the threshold $Sth_i$ Accordingly, there currently remains a need to compute log-likelihood ratios for use by a turbo decoder in a computationally simple manner.

DISCLOSURE OF THE INVENTION

It would be desirable to provide a technique for computing a threshold value used in the computation of log-likelihood metrics that minimises the time, processing resources and power requirements of a communication receiver.

It would also be desirable to provide a technique for calculating log-likelihood ratio metrics in a manner that ameliorates or overcomes one or more disadvantages of known techniques.

With this in mind, one aspect of the invention provides a method for computing a threshold Sthi used in demodulating a quadrature amplitude modulated (QAM) signal to generate a plurality of soft bits per received symbol for input to a turbo decoder, the method including the steps of:

computing the mean amplitude A of the received symbols; and multiplying the mean amplitude A by a constant $C_i$ for a square QAM constellation with $4^m$ points, such that $$Sth_i = A \times C_i$$

where m is a positive integer and i is a positive integer from 1 to $(\sqrt{4^{m-1}})-1$.

A method including these steps efficiently calculates the threshold used in demodulating a QAM signal to generate a plurality of soft bits per received symbol for input to a turbo decoder in High Speed Downlink Packet Access (HSDPA) applications. The threshold is computed as a product of the average amplitude of the received signal and a constant or fixed scaling factor. The estimation of average amplitude of the received signal is relatively straight forward to computed and can be performed efficiently in hardware.

In one embodiment, the mean amplitude A is computed from a block of K received symbols, where K is a positive integer.

The value of K may be inversely proportional to the speed of change in channel conditions.

The constant $C_i$ may be computed according to $$C_i = 2 \times I \times \Delta$$

where $\Delta$ is a normalising parameter for a square QAM constellation with $4^m$ points.

In one embodiment, the QAM signal is a 16 QAM signal and the constant $C_i$ equals $$\frac{2}{\sqrt{10}}.$$

In another embodiment, the QAM signal is a 16 QAM signal and the constant $C_i$ equals 0.5.

The mean amplitude A of the received symbols may be computed according to $$A = \max(AI, AQ) + 0.5 \min(AI, AQ)$$

where AI and AQ are respectively the averages of orthogonal I and Q components of each received symbol.

Alternatively, the mean amplitude A of the received symbols may be computed according to $$A = AI + AQ$$

where AI and AQ are respectively the averages of orthogonal I and Q components of each received symbol.

Another aspect of the invention provides a method for generating soft bits per received symbol for input to a turbo decoder used in demodulating a quadrature amplitude modulated (QAM) signal, the method including the steps of:
computing the threshold $Sth_i$ as described above; and
computing one or more of the soft bits from the threshold $Sth_i$.

As has been explained previously, an efficient way of demodulating a QAM signal is to generate a plurality of soft bits for input to a turbo decoder usually involves calculation of a threshold. A demodulator typically produces the first two soft bits equal to an I component and Q component of a received symbol. One or more of the remaining soft bits are able to be generated according to the present invention as differences between the absolute values of the I component and Q component and the threshold. The simple manner in which the threshold is derived therefore minimises the complexity of the required hardware in a communication receiver.

In one embodiment of the invention, $\log_2 4^m$ soft bits are computed from the threshold $Sth_i$.

Yet another aspect of the invention provides a device for computing a threshold $Sth_i$ used in demodulating a quadrature amplitude modulated (QAM) signal to generate a plurality of soft bits per received symbol for input to a turbo decoder, the device including:
means for computing the mean amplitude A of the received symbols and multiplying the mean amplitude A by a normalising parameter $\Delta$ for a square QAM constellation with $4^m$ points, such that $$Sth_i = A \times C_i$$

where m is a positive integer and i is a positive integer from 1 to $(\sqrt{4^{m-1}}) - 1$.

A further aspect of the invention provides a device for generating soft bits per received symbol for input to a turbo decoder used in demodulating a quadrature amplitude modulated (QAM) signal, the device including:
means for computing the mean amplitude A of the received symbols and multiplying the mean amplitude A by a constant $C_i$ for a square QAM constellation with $4^m$ points, such that $$Sth_i = A \times C_i$$

where m is a positive integer and i is a positive integer from 1 to $(\sqrt{4^{m-1}}) - 1$; and
means for computing one or more of the soft bits from the threshold $Sth_i$.

A still further aspect of the invention provides a communication receiver including a device as described above.

The various features and advantages of the present invention will become more apparent from the following detailed description when taken in conjunction with the accompanying drawings, in which:

BEST MODE FOR CARRYING OUT THE INVENTION

Figure 3:
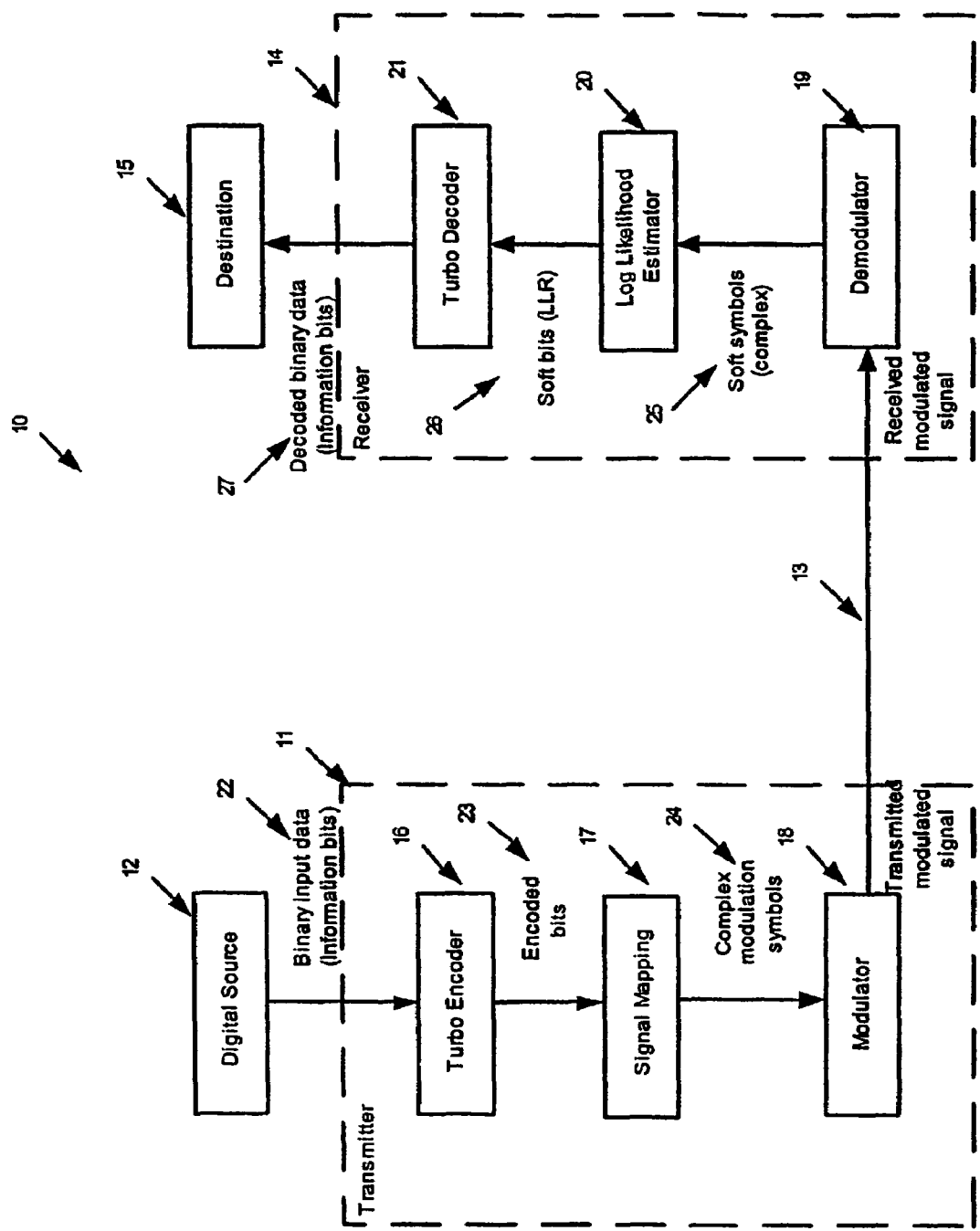
FIG. 3 is a schematic diagram of a communication system including a communication receiver in accordance with one embodiment of the present invention.

Referring now to FIG. 3, there is shown generally a communication system 10 including a transmitter 11 connected to a digital source 12 and configured to receive binary input data from the digital source 12. The transmitter 11 generates and transmits a modulated signal 13 for reception by a receiver 14. The receiver 14 acts to demodulate the received signal and recover decoded binary data which is then forwarded to a destination 15. The transmitter 11 includes a turbo encoder 16, signal mapping block 17 and modulator 18. The receiver includes a demodulator 19, log-likelihood estimator 20 and turbo decoder 21.

Binary input data 22 to be transmitted is encoded with a turbo code by the turbo encoder 16, which generates a sequence of binary symbols 23 referred to as encoded bits. Several encoded bits are blocked together and mapped to a point on a signal constellation by the signal mapping block 17, thereby generating a sequence of complex-valued modulation symbols 24. This sequence is applied to the modulator 18, which generates a continuous-time wave form for transmission to the receiver 14.

The demodulator 19 demodulates the received modulated signal and generates a sequence of complex-valued soft symbol 25. Each soft symbol represents an estimate of a modulation symbol that was transmitted by the transmitter 11. These estimates are used by the log-likelihood estimator 20 to extract log-likelihood metrics (soft bits) 26 associated with the given modulation symbol. The turbo decoder 21 uses the sequence of log-likelihood metrics (soft bits) to decode the binary data that was originally transmitted and recover decoded binary data 27.

Figure 1:
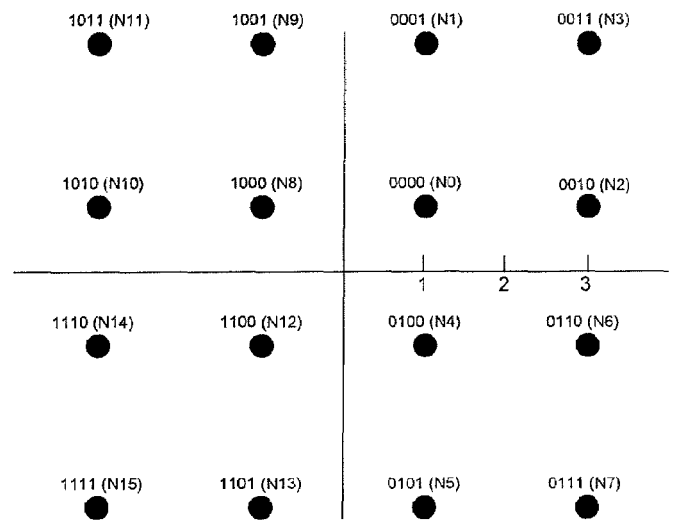
FIG. 1 illustrates a diagram of a 16 QAM signal constellation mapping.

The square 16 QAM constellation shown in FIG. 1 has an index m=2 and is defined to be a signal constellation with $4^m$ points. Each signal point is denoted by its index (i,j) where $0 \leq i, j < 2^m$. The position of each i,j point on the constellation is given by the following formula:

$$\sqrt{\frac{3}{4^m - 1}\left(\frac{1}{2}\right)}.$$

The above formula ensures that the average energy of the signal constellation is normalised to one, where Δ is a normalisation parameter for a square QAM constellation. For a 16 QAM constellation, m=2 and Δ=

$$\frac{1}{\sqrt{10}}.$$

For other square QAM constellations, the value of both m and Δ will change. Accordingly, for a 64 QAM constellation, m=3 and Δ=

$$\frac{1}{\sqrt{42}},$$

whilst for a 256 QAM constellation, m=4 and Δ=

$$\frac{1}{\sqrt{170}}.$$

Each signal pointing the constellation is labelled with a binary string that denotes a block of encoded bits associated with the modulation symbol. As can be seen in FIG. 1, grey code mapping is used to associate the modulation symbols with blocks of encoded bits. In this case, each of the $4^m$ points in the constellation is identified by a 4 bit code including bits b0, b1, b2 and b3. In other square QAM constellations, the number of bits in the grey code may vary. For example, in a 64 QAM constellation, each point is identified by a 6 bit grey code.

Figure 2:
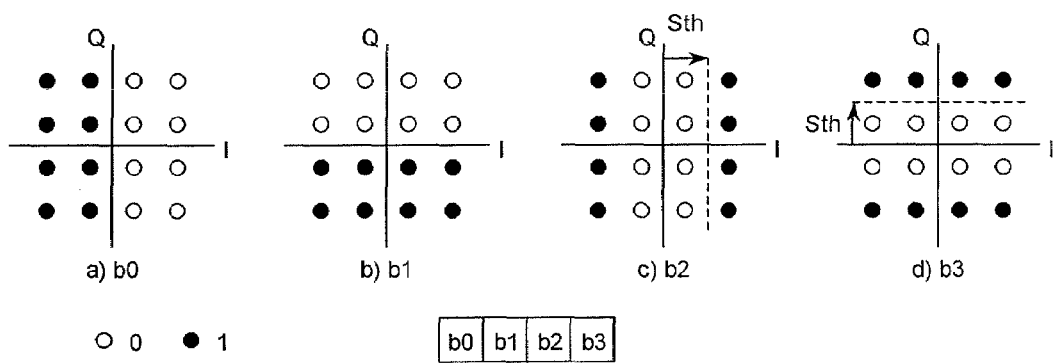
FIG. 2 is a diagram of the constellation mapping showing the value of each of 4 encoded bits within a grey code representing each symbol in the constellation mapping.

Because information and encoded bits are random, all 16 symbols in the constellation shown in FIG. 1 are expected to occur with a relatively equal probability given a sufficient observation length in the processing circuitry of the receiver 14. An optimal threshold should therefore provide an equal likelihood for the bits b2 and b3. The mathematical expectation, or mean, of likelihood values for the bits b2 and b3 should also be the same. If there is no noise in the received signal, the threshold $Sth_i$ will therefore fall in the middle of b2 (or b3)=0 and b2 (or b3)=1 as shown in FIG. 2. If the received signal is corrupted by noise, the distribution of the absolute values of the I and Q components will spread out and the threshold will be shifted to the right compared to the case in which no noise is present.

Taking this into account, an optimal value for the threshold $Sth_i$ is given by the following formula:

$$Sth_i = \sqrt{E} \times \frac{2}{\sqrt{10}} = A \times \frac{2}{\sqrt{10}} = A \times const$$

where E and A are respectively estimates of the mean energy and amplitude of received symbols in the demodulator 19. The value of the constant is given by $$\frac{2}{\sqrt{10}}$$

and is calculated, according to FIGS. 1 and 2, so that the threshold $Sth_i$ falls in the middle of b2 (or b3)=0 and b2 (or b3)=1 if there is no noise. If the received signal also contains noise, then the estimate data energy E also includes signal and noise variance and the estimated threshold is therefore larger than in the case of no noise. In this instance, the estimate can be used as an approximation of the optimal threshold.

The above described example can be generalised to cover other square QAM constellations with $4^m$ points. In this generalised case, the optimum value of the threshold $Sth_i = A \times 2 \times i \times \Delta$, where m is a positive integer and i is a positive integer from 1 to $(\sqrt{4^{m-1}}) - 1$.

Figure 4:
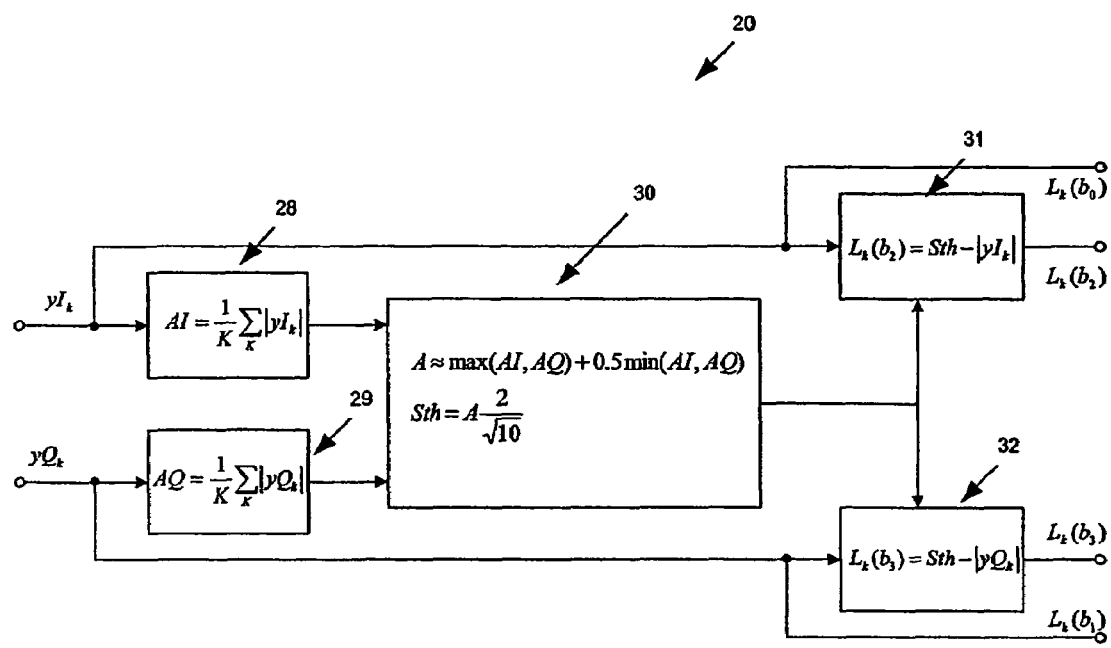
FIG. 4 is a schematic diagram of a first embodiment of a soft bit estimator forming part of the communication receiver shown in FIG. 3.

It will be appreciated that the computation of A and the multiplication of A by a constant to derive the optimal value of the threshold $Sth_i$ is very simple and efficient to implement in hardware. One such hardware implementation is illustrated in FIG. 4, which shows a more detailed view of the log-likelihood estimator 20 of the receiver 14. In this Figure, the channel estimates $yI_k$ and $yQ_k$ are received from the demodulator 19. The average amplitude of the I channel estimate over a block of K symbols is determined by a first averaging block 28. Similarly, the average amplitude of the Q channel estimates over a block of K symbols is computed in the second averaging block 29.

The value of K is chosen so as to optimise receiver performance, depending upon the speed of change in channel condition. In fast fading conditions, an excessively large value of K will prevent the calculated threshold from following the optimal threshold. However, a value of K that is too small will not provide enough statistical information for a proper threshold calculation to be performed. The value of K is preferably inversely proportional to the speed of change in channel condition.

The outputs of the averaging blocks 28 and 29 are input into a processing block 30 which approximates the mean amplitude A of each received symbol according to the equation A≈max(AI, AQ)+0.5 min(AI, AQ), where AI and AQ are respectively the averages of orthogonal I and Q components of each received symbol. The processing block 30 multiplies that mean amplitude A by a constant, which in the case of a 16 QAM signal is $$\frac{2}{\sqrt{10}}$$

to determine an optimised value of the threshold $Sth_i$.

The calculated threshold value is then applied at the output of the processing block 30 to the inputs of subtraction blocks 31 and 32. In subtraction block 31, the absolute value of the I channel estimate for each symbol is subtracted from the threshold value $Sth_i$ to derive the log-likelihood of the bit b2. Similarly, the absolute magnitude of the Q channel estimate for a received symbol is subtracted from the value of the threshold $Sth_i$ to derive the value of the log-likelihood of the bit b3. The log-likelihoods of the bits b0 and b1 respectively equal the received I and Q channel estimates.

Accordingly, the log-likelihood estimator 20 provides 4 log-likelihood outputs $L_k(b_0), L_k(b_1), L_k(b_2), L_k(b_3)$ corresponding to each of 4 soft bits provided to the turbo decoder in use in demodulating the 16 QAM signal. In this figure, the log-likelihood estimator 20 approximates the amplitude A and the threshold $Sth_i$ based on K input symbols, and then uses this approximated value for demodulating each of those K received symbols.

It will be appreciated that in other embodiments of the invention involving square QAM constellations other than the 16 QAM constellation described above, the same principle is used by the log-likelihood estimator 20 the threshold $Sth_i$ however the processing block 30 may be required to calculate multiple threshold values $Sth_i = A \times 2 \times i \times \Delta$, where m>1 is a positive integer and i is a positive integer from 1 to $(\sqrt{4^{m-1}})-1$. For example, in the case of a 64 QAM signal constellation, the thresholds $Sth_{i(1/2/3)}$ will be equal to $$\frac{(2/4/6)}{\sqrt{42}}.$$

Similarly, for a 256 QAM signal constellation, the thresholds $Sth_{i(1/2/3/4/5/6/7)}$ equals $$\frac{(2/4/6/8/10/12/14)}{\sqrt{170}}.$$

By taking advantage of the randomness of data transmitted, the computation of the log-likelihood values is independent from the symbol processing, and can be realised as a stand alone block. Moreover, no assumptions about data to pilot ratio or proportional of pilot signal over total power need be made. The processing required to effect this computation is very simple and efficient, and requires minimal power consumption and time.

Figure 5:
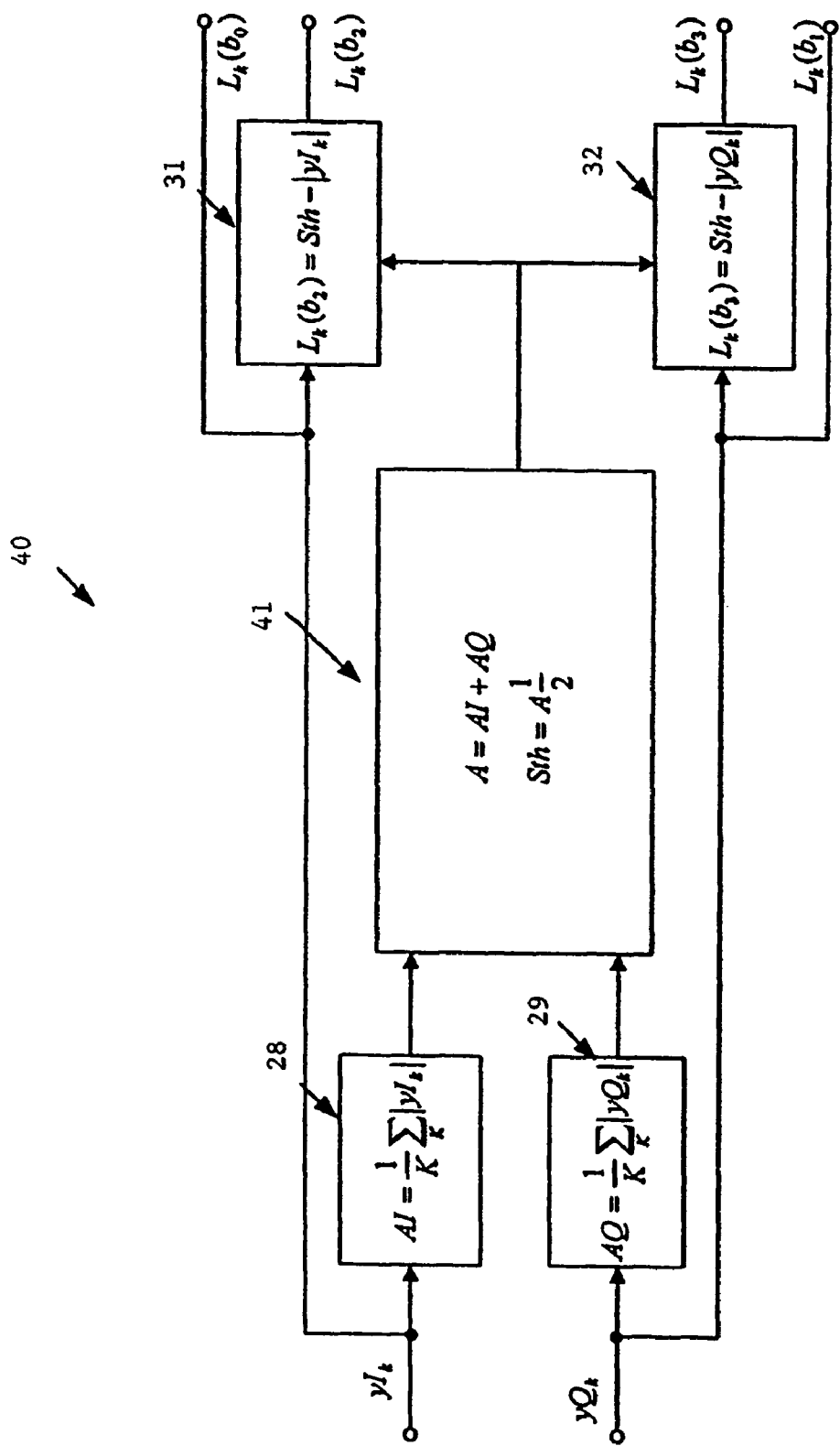
FIG. 5 is a schematic diagram of a second embodiment of a soft bit estimator forming part of the communication receiver shown in FIG. 3.

Another hardware implementation of a log-likelihood estimator is shown in FIG. 5. In this example, the log-likelihood estimator 40 is identical to the log-likelihood estimator 20 shown in FIG. 4, except for the processing block 41 which computes the threshold $Sth_i$ in a different manner.

The processing block 41 approximates the mean amplitude A of each received symbol according to the equation A=AI+AQ. The processing block 41 then multiplies that mean amplitude A by a constant, which in the case of a 16 QAM signal is 0.5 to determine an optimised value of the threshold $Sth_i$.

It will be appreciated that the hardware implementation shown in FIG. 5 has the advantage of being simpler to realise that the hardware implementation shown in FIG. 1. The computation of the mean amplitude A only requires the addition of two quantities, namely AI and AQ. In the case of a 16 QAM signal, the value of [AI+AQ] is slightly greater than the value of [max (AI, AQ)+0.5×min (AI, AQ)] computed by the processing block 30 shown in FIG. 4. However, this is compensated by the fact that the factor 0.5, by which [AI, AQ] is multiplied, is slightly less than factor $$\frac{2}{\sqrt{10}}$$

(=0.632) by which [max (AI,AQ)+0.5×min (AI, AQ)] is multiplied.

The hardware implementations shown in FIGS. 4 and 5 are both illustrative of a more general principle for computing a threshold. ?? this used in demodulating a QAM signal to generate soft bits per received symbol for input to a turbo decoder, in which the mean amplitude A of the received symbols is computed, and the mean amplitude A is multiplied by a constant $C_i$ for a square QAM constellation with $4^m$ points, such that $Sth_i = A \times C_i$, where m is a positive integer and i is a positive integer from 1 to $(\sqrt{4^{m-1}})-1$. FIGS. 4 and 5 illustrate two different techniques for computing the mean amplitude A.

The constant $C_i$ in FIG. 4 is computed according to $C_i 2 \times i \times \Delta$ where $\Delta$ is a normalising parameter for a square constellation with $4^m$ points, whilst the constant $C_i$ in FIG. 5 is simply 0.5 for a 16 QAM constellation.

In general, for demodulation of a QAM constellation with $4^m$ points, there will be $(\sqrt{4^{m-1}})-1$ different constants $C_i$ and correspondingly there will be $(\sqrt{4^{m-1}})-1$ different values of the threshold $Sth_i$.

Finally, it is to be understood that various modifications and/or additions may be made to the above described method or device without departing from the spirit or ambit of the invention.

The invention claimed is:

1. A method on a communication receiver having a soft bit generator and a turbo decoder, the method for computing a threshold $Sth_i$ used in demodulating a quadrature amplitude modulated (QAM) signal received by the communication receiver to generate a plurality of soft bits per received symbol for input to the turbo decoder, the method including the steps of:

the soft bit generator:
computing a mean amplitude A of the received symbols;
multiplying the mean amplitude A by a constant $C_i$ for a square QAM constellation with $4^m$ points, such that $Sth_i = A \times C_i$ where m is a positive integer and I is a positive integer from 1 to $(\sqrt{4^{m-1}})-1$;
computing one or more of the soft bits from the threshold $Sth_i$; and
outputting the computed soft bits to the turbo decoder.

2. A method according to claim 1, wherein the mean amplitude A is computed from a block of K received symbols, where K is a positive integer.

3. A method according to either one of claims 1 or 2, wherein the value of K is inversely proportional to the speed of change in channel conditions.

4. A method according to either one of claims 1 or 2, wherein the constant $C_i$ is computed according to $C_i = 2 \times I \times \Delta$ where $\Delta$ is a normalising parameter for a square QAM constellation with $4^m$ points.

5. A method according to claim 4, wherein the QAM signal is a 16QAM signal and the constant $C_i$ equals $\frac{2}{\sqrt{10}}$.

6. A method according to claim 4, wherein the QAM signal is a 16QAM signal and the constant $C_i$ equals 0.5.

7. A method according to claim 1, wherein the mean amplitude A of the received symbols is computed according to $$A = \max(AI, AQ) + 0.5 \min(AI, AQ)$$

where AI and AQ are respectively the averages of orthogonal I and Q components of each received symbol.

8. A method according to either one of claims 1 or 2, wherein the mean amplitude A of the received symbols is computed according to $$A = AI + AQ$$

where AI and AQ are respectively the averages of orthogonal I and Q components of each received symbol.

9. A method according to claim 1, wherein $\log 2 \, 4m$ soft bits are computed from the threshold $Sth_i$.

10. A device within a communication receiver for computing a threshold $Sth_i$ used in demodulating a quadrature amplitude modulated (QAM) signal received by the communication receiver to generate a plurality of soft bits per received symbol for input to a turbo decoder, the device including:

means for computing a mean amplitude A of the received symbols and multiplying the mean amplitude A by of the received symbols and multiplying the mean amplitude A by a constant $C_i$ for a square QAM constellation with $4^m$ points, such that $$Sth_i = A \times C_i$$

where m is a positive integer and i is a positive integer from 1 to $(\sqrt{4^{m-1}}) - 1$;

means for computing one or more of the soft bits from the threshold $Sth_i$; and means for outputting the computed soft bits to the turbo decoder.

11. A device within a communication receiver for generating soft bits per received symbol for input to a turbo decoder used in demodulating a quadrature amplitude modulated (QAM) signal received by the communication receiver, the device including:

means for computing a mean amplitude A of the received symbols and multiplying the mean amplitude A by a constant $C_i$ for a square QAM constellation with $4^m$ points, such that $$Sth_i = A \times C_i$$

where m is a positive integer and i is a positive integer from 1 to $(\sqrt{4^{m-1}}) - 1$; and means for computing one or more of the soft bits from the threshold $Sth_i$; and means for outputting the computed soft bits to the turbo decoder.

\* \* \* \* \*